United States Patent
Cuva

(10) Patent No.: US 10,077,741 B2
(45) Date of Patent: Sep. 18, 2018

(54) SPRAYBAR FACE SEAL RETENTION ARRANGEMENT

(75) Inventor: William J. Cuva, Jupiter, FL (US)

(73) Assignee: United Technologies Corporation, Farmington, CT (US)

(\*) Notice: Subject to any disclaimer, the term of this patent is extended or adjusted under 35 U.S.C. 154(b) by 1688 days.

(21) Appl. No.: 13/482,992

(22) Filed: May 29, 2012

(65) Prior Publication Data

US 2013/0318980 A1 Dec. 5, 2013

(51) Int. Cl.
*F02K 3/10* (2006.01)
*F02C 7/22* (2006.01)

(52) U.S. Cl.
CPC .............. *F02K 3/10* (2013.01); *F02C 7/222* (2013.01); *F05D 2240/55* (2013.01); *F05D 2260/38* (2013.01); *Y10T 29/494* (2015.01)

(58) Field of Classification Search
USPC ........ 60/761–766, 39.17, 796–800; 277/630, 277/637, 496, 497, 498, 499, 631, 626, 277/627, 644, 650
See application file for complete search history.

(56) References Cited

U.S. PATENT DOCUMENTS

| | | | |
|---|---|---|---|
| 3,910,038 A * | 10/1975 | Bourdereau et al. | ........... 60/763 |
| 4,280,324 A | 7/1981 | Arliquie et al. | |
| 4,833,881 A | 5/1989 | Vdoviak et al. | |
| 4,887,425 A | 12/1989 | Vdoviak | |
| 5,385,015 A | 1/1995 | Clements et al. | |
| 5,400,589 A | 3/1995 | Mahias et al. | |
| 5,685,140 A | 11/1997 | Clements et al. | |
| 6,125,627 A | 10/2000 | Rice et al. | |
| 6,971,239 B2 | 12/2005 | Snyder et al. | |
| 7,506,513 B2 * | 3/2009 | Roche et al. | .................... 60/761 |
| 7,596,950 B2 * | 10/2009 | Woltmann et al. | ............. 60/765 |
| 7,954,328 B2 | 6/2011 | Atassi | |
| 8,123,228 B2 | 2/2012 | Muldoon et al. | |
| 2004/0226298 A1 | 11/2004 | Snyder et al. | |
| 2007/0006589 A1 | 1/2007 | Muldoon et al. | |
| 2007/0006590 A1 | 1/2007 | Muldoon et al. | |

OTHER PUBLICATIONS

International Preliminary Report on Patenability for International Application No. PCT/US2013/039597 dated Dec. 11, 2014.

\* cited by examiner

*Primary Examiner* — Todd E Manahan
*Assistant Examiner* — Rene Ford
(74) *Attorney, Agent, or Firm* — Carlson, Gaskey & Olds, P.C.

(57) ABSTRACT

An example turbomachine assembly includes a plurality of fuel spraybars spaced about a turbine exhaust inner case of the turbomachine. At least one fuel injector assembly is associated with each of the fuel spraybars. The at least one fuel injector assembly may include a fuel nozzle having a fuel delivery conduit. The at least one fuel injector assembly includes a seal member that is biased away from the fuel nozzle in a direction. The fuel nozzle is configured to limit movement of the seal member in the direction.

13 Claims, 7 Drawing Sheets

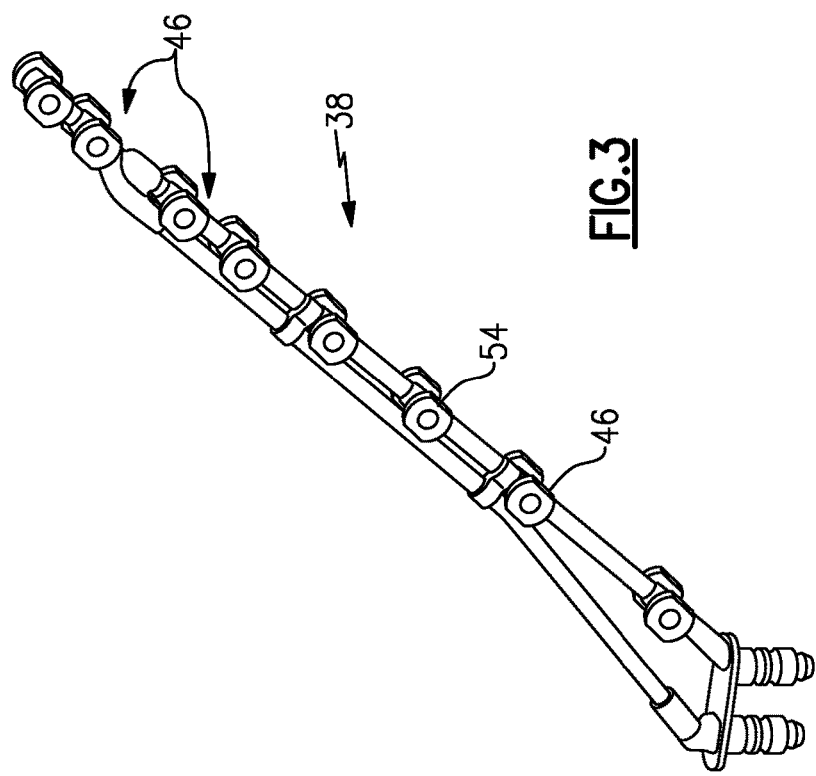
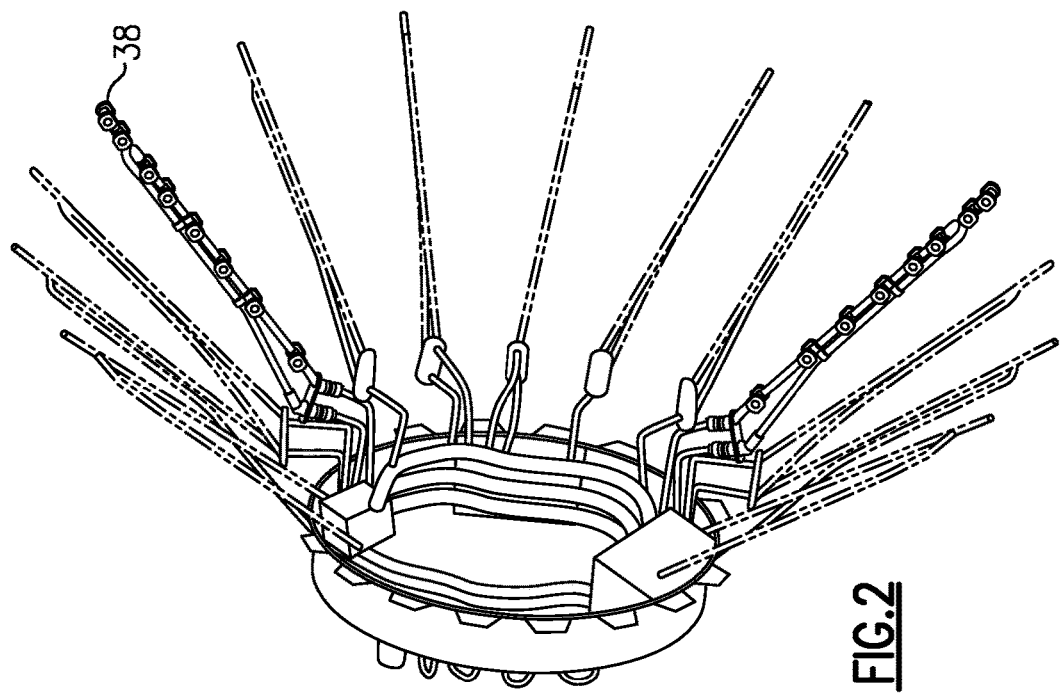

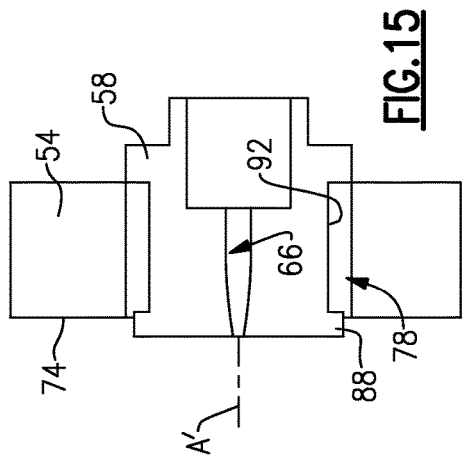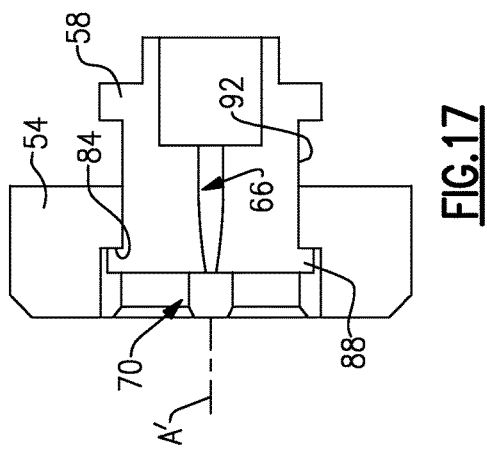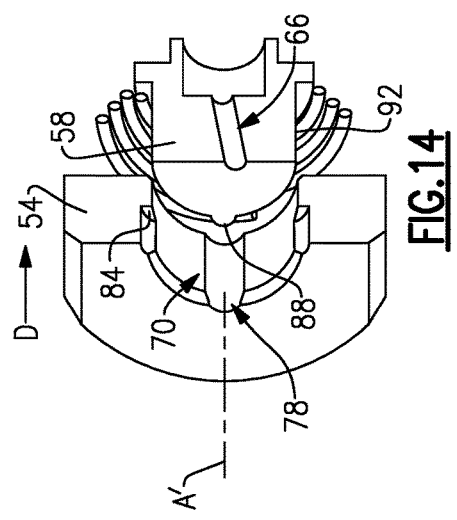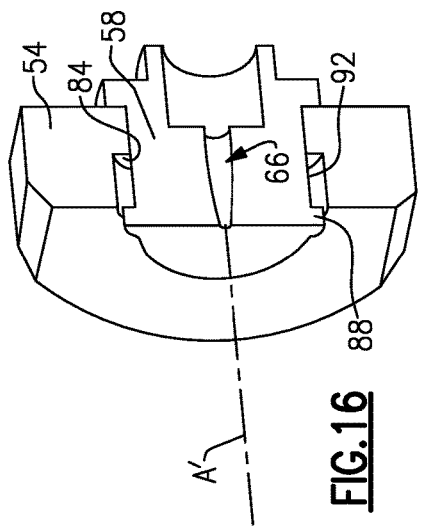

SPRAYBAR FACE SEAL RETENTION ARRANGEMENT

STATEMENT REGARDING FEDERALLY SPONSORED RESEARCH OR DEVELOPMENT

This invention was made with government support under Contract No. N00019-02-C-3003 awarded by the United States Navy. The Government has certain rights in this invention.

BACKGROUND

This disclosure relates generally to sealing a spray bar fuel nozzle with a seal and, more particularly, to retaining the seal.

Turbine machines may include augmentors or "afterburners" to provide an increase in thrust. Within an augmentor section of a turbomachine, fuel is sprayed into a core stream. The fuel ignites to produce the desired additional thrust. The fuel is delivered to the core stream upstream of a flame holding device. Spraybars contain nozzles that deliver the fuel.

The spraybars typically positioned within some flow deflecting structure, such as a trailing edge boxes of vanes. A cooling flow of air moves through these structures. Nozzles mounted to the spraybars deliver fuel through holes in the structure to the hot gas path. Seals associated with each nozzle limit movement of air from inside the structure to the hot gas path. Supporting these seals is often difficult.

SUMMARY

A turbomachine assembly according to an exemplary aspect of the present disclosure includes, among other things, a plurality of fuel spraybars spaced about a turbine exhaust inner case of the turbomachine. At least one fuel injector assembly is associated with each of the fuel spraybars. The at least one fuel injector assembly includes a fuel nozzle having a fuel delivery conduit. The fuel injector assembly includes a seal member that is biased away from the fuel nozzle in a direction. The fuel nozzle is configured to limit movement of the seal member in the direction.

In a further non-limiting embodiment of the foregoing turbomachine assembly, the fuel nozzle may include radially extending tabs that limit movement of the seal member in the direction.

In a further non-limiting embodiment of either of the foregoing turbomachine assemblies, the direction may be perpendicular to a direction of flow through the spraybar.

In a further non-limiting embodiment of any of the foregoing turbomachine assemblies, the seal member may include a bore that receives the fuel nozzle.

In a further non-limiting embodiment of any of the foregoing turbomachine assemblies, the seal may include at least one pass-through groove and at least one truncated groove.

In a further non-limiting embodiment of any of the foregoing turbomachine assemblies, the plurality of fuel spraybars may be positioned within a trailing edge box.

In a further non-limiting embodiment of any of the foregoing turbomachine assemblies, the fuel nozzle may be configured to deliver fuel through windows in the trailing edge box.

A turbomachine assembly according to another exemplary aspect of the present disclosure includes, among other things, a fuel nozzle having a fuel delivery conduit, a seal having a bore configured to receive a portion of the fuel nozzle, and a tab configured to contact a groove floor to limit withdrawal of the fuel nozzle from the bore.

In a further non-limiting embodiment of the foregoing turbomachine assembly, the fuel nozzle may include the tab and the seal may include the groove floor.

In a further non-limiting embodiment of either of the foregoing turbomachine assemblies, the fuel nozzle may include the groove floor and the seal may include the tab.

In a further non-limiting embodiment of any of the foregoing turbomachine assemblies, the tab and the fuel nozzle may be portions of the same monolithic component.

In a further non-limiting embodiment of any of the foregoing turbomachine assemblies, the fuel nozzle may be configured to deliver fuel through the fuel delivery conduit to a hot gas flow path of a turbomachine.

A method of securing a fuel injector seal assembly according to another exemplary aspect of the present disclosure includes, among other things, placing a fuel nozzle within a bore of a seal, and selectively limiting withdrawal of the fuel nozzle from the bore based on the circumferential position of the fuel nozzle relative to the bore.

In a further non-limiting embodiment of the foregoing method of securing an injector nozzle seal, the method may include contacting a tab of the fuel nozzle against a groove floor of the seal during the selective limiting.

In a further non-limiting embodiment of the foregoing method of securing an injector nozzle seal, the method may include contacting a tab of the seal against a groove floor of the fuel nozzle during the selective limiting.

DESCRIPTION OF THE FIGURES

The various features and advantages of the disclosed examples will become apparent to those skilled in the art from the detailed description. The figures that accompany the detailed description can be briefly described as follows:

FIG. 2 shows a circumferential array of spraybars from an augmentor section of the turbomachine of FIG. 1.

FIG. 3 shows a spraybar from the array of FIG. 2.

FIG. 14 shows a section view of the fuel nozzle assembly of FIG. 8 at a beginning stage of installation.

FIG. 15 shows a section view of the fuel nozzle assembly of FIG. 8 at a later stage of installation than FIG. 14 and with a biasing member removed for clarity.

FIG. 16 shows the section view of FIG. 14 at a later stage of installation than FIG. 15 and with a biasing member removed for clarity.

FIG. 17 shows a section view at a later stage of installation than FIG. 16 and with a biasing member removed for clarity.

DETAILED DESCRIPTION

Figure 1:
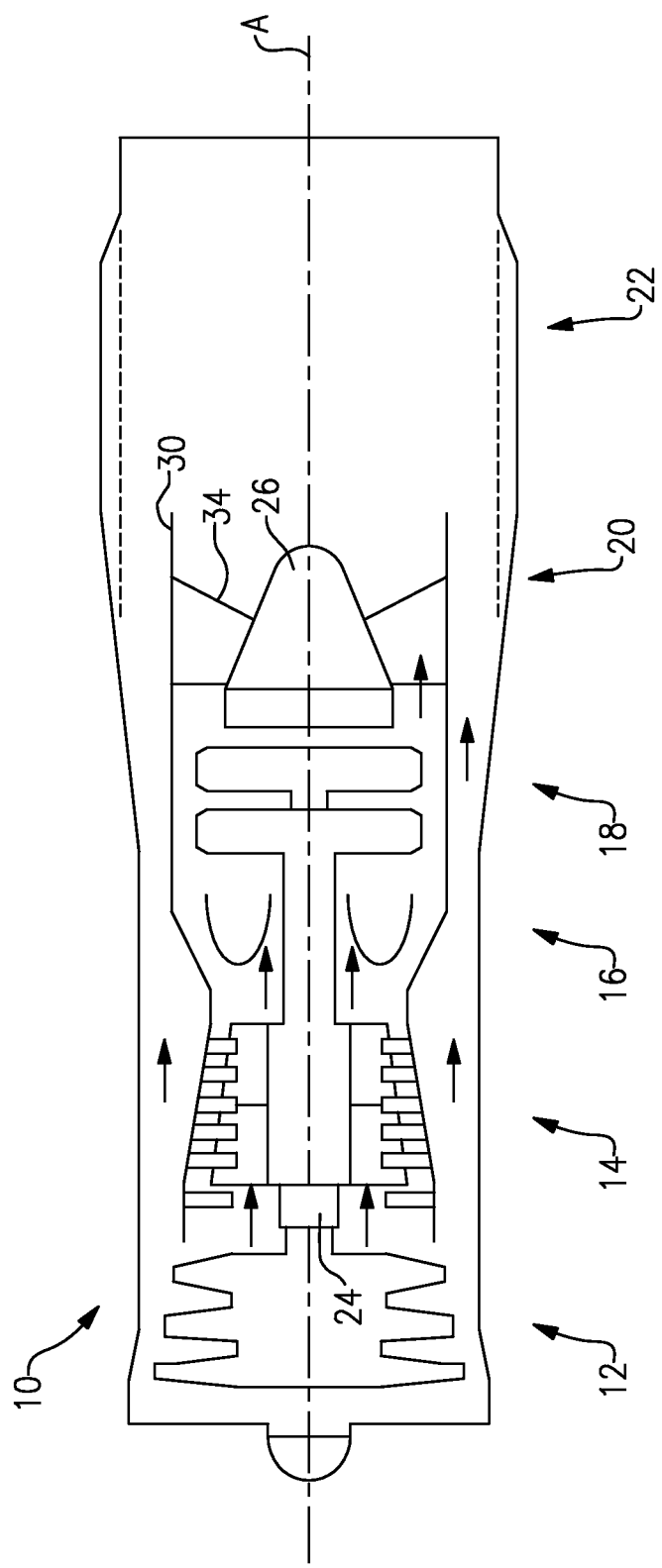
FIG. 1 is a schematic side view of an example turbomachine.
Figure 4:
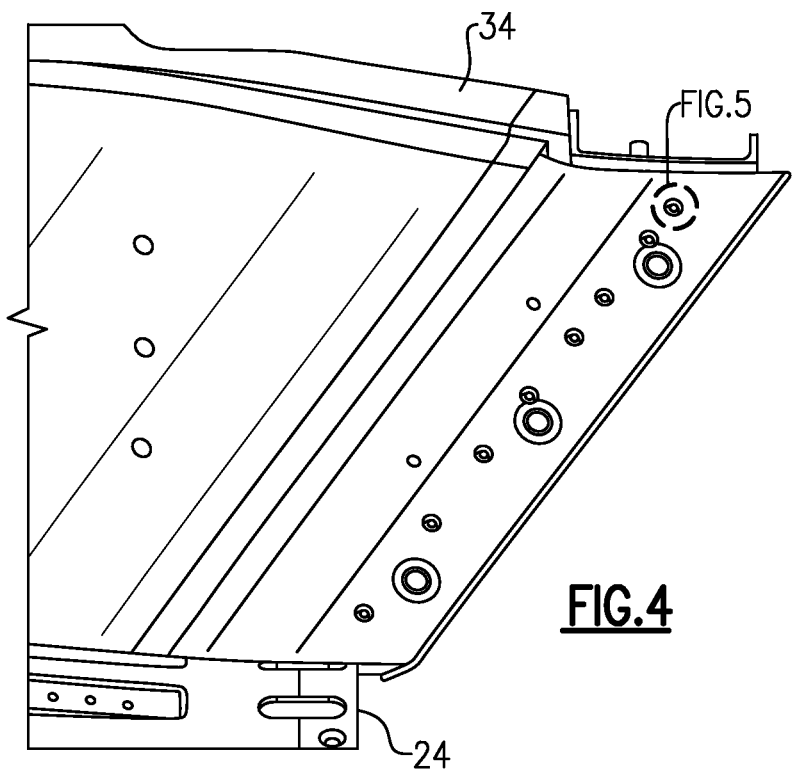
FIG. 4 shows the spraybar of FIG. 3 within a trailing edge box.
Figure 5:
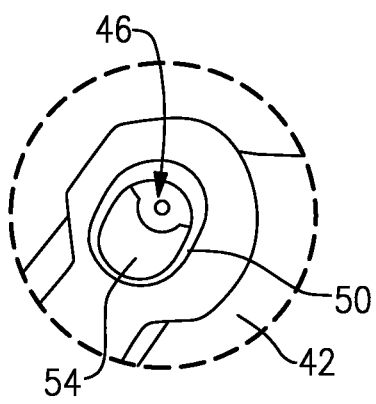
FIG. 5 shows a close-up view of Area 5 in FIG. 4.
Figure 6:
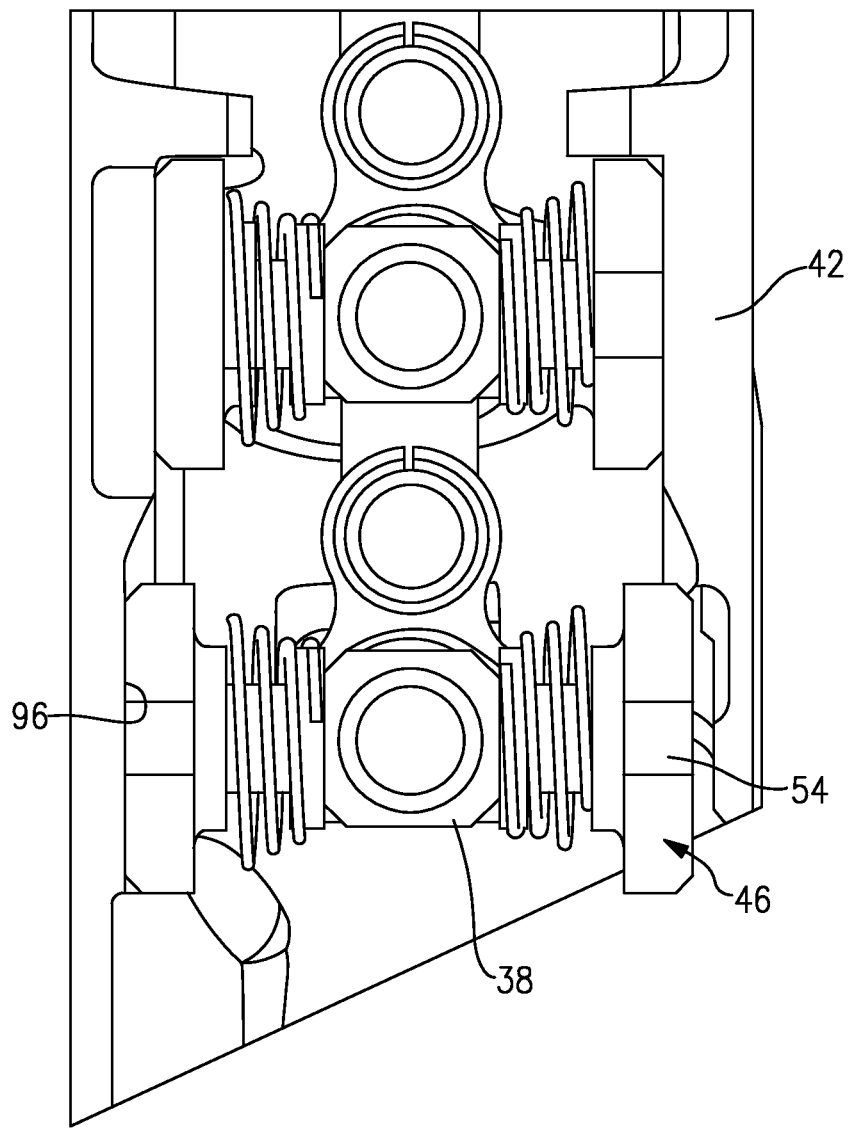
FIG. 6 shows a rear view of the spraybar of FIG. 4 within the trailing edge box and with a portion of the trailing edge box removed.
Figure 7:
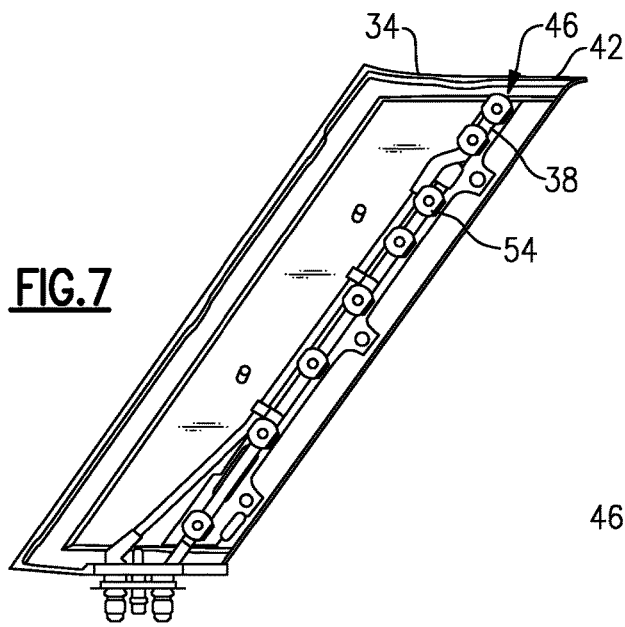
FIG. 7 shows a side view of the spraybar of FIG. 4 within the trailing edge box and with a portion of the trailing edge box removed.
Figure 8:
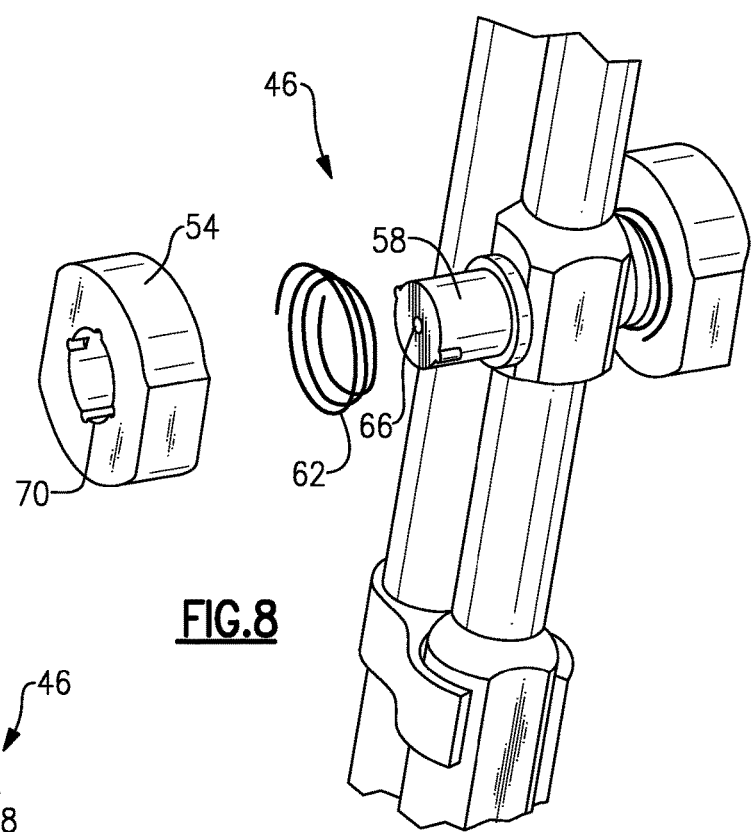
FIG. 8 shows an exploded view of a fuel nozzle assembly of the spraybar of FIG. 3.
Figure 9:
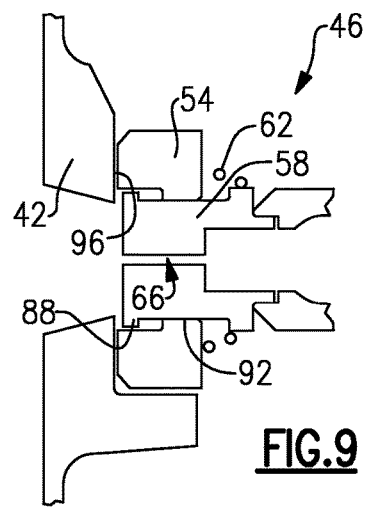
FIG. 9 shows a section view of the fuel nozzle assembly of FIG. 8 interfacing with the trailing edge box of FIG. 4.
Figure 11:
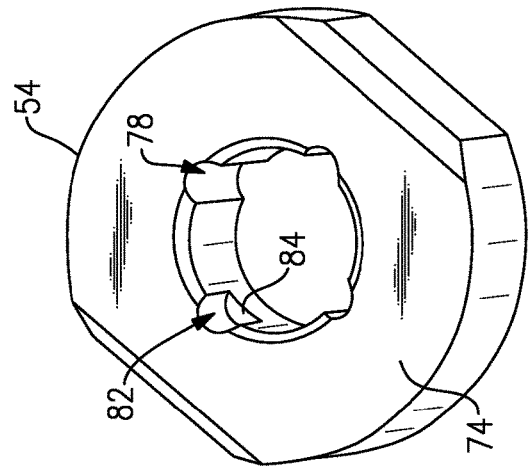
FIG. 11 shows a section view of the face seal at line 11-11 in FIG. 10.
Figure 13:
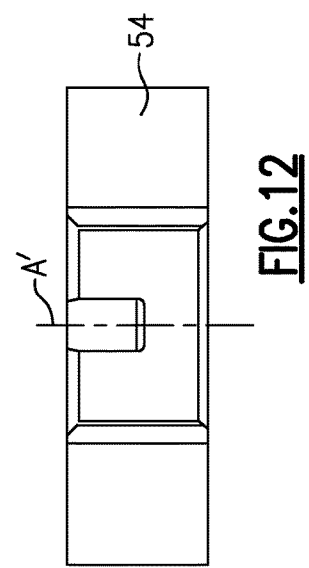
FIG. 13 shows a perspective view of the face seal of FIG. 10.
Figure 12:
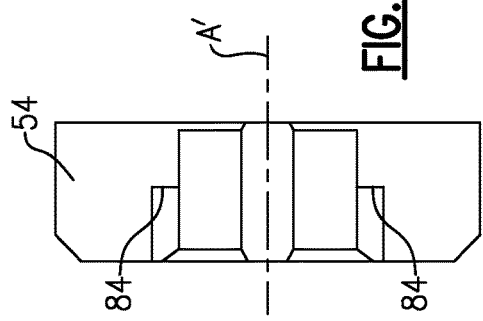
FIG. 12 shows a section view of the face seal at line 12-12 in FIG. 10.
Figure 10:
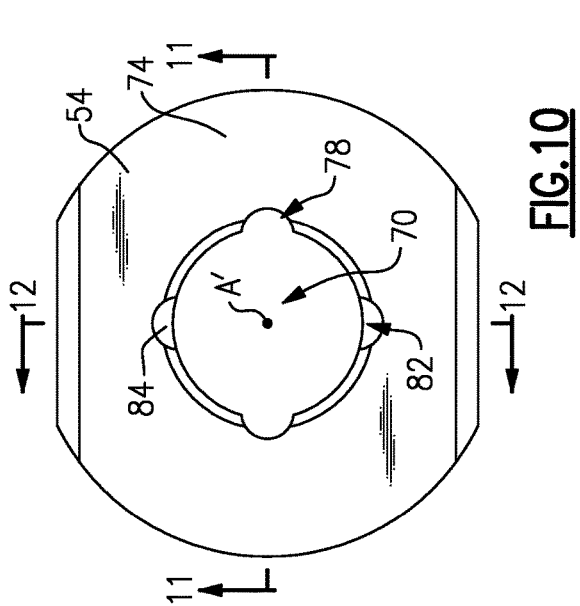
FIG. 10 shows a front view of a face seal of the FIG. 8 fuel nozzle assembly.

Referring to FIG. 1, an example turbomachine 10 includes a fan section 12, a compression section 14, a combustor section 16, a turbine section 18, an augmentor section 20, and an exhaust section 22. The compressor section 14, combustor section 16, and turbine section 18 are generally referred to as the core engine. An axis A extends longitudinally through the turbomachine 10.

Although depicted as a two spool gas turbine engine in the disclosed non-limiting embodiment, it should be understood that the concepts described herein are not limited to use with such two spool designs. That is, the teachings may be applied to other types of turbomachines and gas turbine engines, including three spool architectures.

In the example engine 10, flow moves from the fan section 12 to a bypass flowpath. Flow from the bypass flowpath generates forward thrust. The compressor section 14 drives flow along a core flowpath. Compressed air from the compressor section 14 communicates through the combustor section 16. The products of combustion expand through the turbine section 18.

In some examples, the turbomachine 10 may incorporate a geared architecture 24 that allows a fan of the fan section 12 to rotate at a slower speed than a turbine that is driving the fan. The geared architecture 24 may include an epicyclic geartrain, such as a planetary geartrain, or some other gear system.

Referring now to FIGS. 2 to 7 with continuing reference to FIG. 1, the augmentor section 20 of the example engine 10 includes an inner turbine exhaust case 26, an outer turbine exhaust case 30, and an annular array of vanes 34 extending radially therebetween. Each of the vanes 34 houses a spraybar 38 within a trailing edge box 42 of the vane 34. The spraybar 38 supports a plurality of fuel injector assemblies 46 at varied radial positions.

During operation of the engine 10, fuel moves from the inner turbine exhaust case 26 through the spraybar 38. Other examples introduce fuel to the spraybars 38 from other areas of the engine 10. The fuel exits the spraybar 38 at the fuel injector assemblies 46. The fuel moves from the fuel injector assemblies 46 through windows 50 in the trailing edge box 42 of the vane 34. The fuel is in a hot gas flow path of the engine 20 after moving through the windows 50. The fuel is ignited to provide additional engine thrust.

Cooling air moves through the trailing edge box 42 of the vane to cool the spraybar 38 and surrounding structures. Each of the fuel injector assemblies 46 includes a face seal member 54 that limits leakage of cooling air through the windows 50 into the hot gas flowpath. Such leakage causes inefficiencies, as is known.

Referring now to FIGS. 8 to 13, in addition to the seal member 54, the example fuel injector assemblies 46 include a fuel nozzle 58 and a biasing member, such as a spring 62. The fuel nozzles 58 each include a fuel delivery conduit 66 that directs fuel from the spraybar 38 into the hot gas flowpath. The fuel delivery conduit 66 delivers fuel in a direction that is generally perpendicular to the direction of flow through the spraybar 38. In this example, the fuel delivery conduit 66 of the fuel nozzle 58 directs fuel circumferentially, and the main portion of the spraybar 38 directs flow radially.

The seal member 54 includes a bore 70 extending from a seal face 74 of the seal member to an opposite side of the seal member 54. The bore 70 extends along an axis A'. The bore 70 receives the fuel nozzle 58.

The seal member 54 includes two pass-through grooves 78 at an outer perimeter of the bore 70. The pass-through grooves 78 extend the length of the bore 70 from the seal face 74 to the opposing surface of the seal member 54.

The seal member 54 includes two truncated grooves 82 at an outer perimeter of the bore 70. The truncated grooves 82 differ from the pass-through grooves 78 as the truncated grooves 82 each terminate a groove floor 84 rather than extending the length of the bore 70.

In this example, the pass-through grooves 78 are disposed at opposing circumferential positions. Similarly, the truncated grooves 82 are disposed at circumferentially oppose positions. The pass-through grooves 78 and the truncated grooves 82 are distributed circumferentially about the perimeter of the bore 70 every 90 degrees.

Tabs 88 or ears extend from an outer surface 92 of the fuel nozzle 58. In the example, the tabs 88 must be circumferentially aligned with the pass-through grooves 78 for the fuel nozzle 58 to be received within the bore 70. The tabs 88 prevent the bore 70 of the seal member 54 from receiving the fuel nozzle 58 when the tabs 88 are not circumferentially aligned with the pass-through grooves 78.

Referring now to FIGS. 14 to 17, an example installation procedure for installing the seal member 54 on the fuel nozzle 58 includes circumferentially aligning the pass-through grooves 78 with the tabs 88, and then moving the seal member 54 toward the spraybar 38 and against a biasing force of the spring 62 in a direction D. The seal member 54 is moved far enough so that the tabs 88 protrude completely beyond the seal face 74.

The seal member 54 is then rotated 90 degrees about the axis A' of the bore 70 until the tabs 88 are aligned with the grooves 82. In this example, the seal member 54 is rotated 90 degrees. The force opposing the biasing force of the spring 62 is then removed causing the spring biasing force of the spring 62 to move the seal member 54 opposite the direction D. The tabs 88 then contact the groove floors 84. This contact prevents the spring biasing force from causing the fuel nozzle 58 to move completely out of bore 70. The tabs 88 contacting the groove floors 84 thus prevent the fuel nozzle 58 from withdrawing from the bore 70.

Referring again to FIGS. 4 to 7, the spraybar 38 having the assembled seal member 54 is then placed within the trailing edge box 42. The seal face 74 contacts an inner surface 96 of the trailing edge box 42 to limit movement of air from an interior of the trailing edge box 42 to the hot gas flow path.

Features of the disclosed examples include a fuel nozzle assembly supporting a seal without the use of a separate supporting component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine assembly, comprising:
a plurality of fuel spraybars spaced about a turbine exhaust inner case of the turbomachine;
at least one fuel injector assembly associated with each of the fuel spraybars, the at least one fuel injector assembly including fuel nozzle having a fuel delivery conduit; and
a seal member of the at least one fuel injector assembly, wherein the seal member is biased away from the fuel nozzle in a direction, and the fuel nozzle is configured to contact the seal member to limit movement of the seal member in the direction, the seal member a continuous, monolithic component.

2. The turbomachine assembly of claim 1, wherein the fuel nozzle includes radially extending tabs that limit movement of the seal member in the direction.

3. The turbomachine assembly of claim 1, wherein the direction is perpendicular to a direction of flow through the spraybar.

4. The turbomachine assembly of claim 1, wherein the seal member includes a bore that receives the fuel nozzle.

5. The turbomachine assembly of claim 1, wherein the seal member includes at least one pass-through groove and at least one truncated groove.

6. The turbomachine assembly of claim 1, wherein the plurality of fuel spraybars are positioned within a trailing edge box.

7. The turbomachine assembly of claim 1, including a biasing member that biases the seal member away from the fuel nozzle in the direction.

8. The turbomachine assembly of claim 7, wherein the biasing member is a spring.

9. The turbomachine assembly of claim 1, wherein the fuel nozzle is received within a bore of the seal member and the fuel nozzle is configured to directly contact the seal member to limit movement of the seal member through the bore in the direction.

10. The turbomachine assembly of claim 1, wherein one of the fuel nozzle or the seal member includes a tab configured to contact a groove floor in the other of the fuel nozzle or the seal member to limit movement of the seal member in the direction.

11. The turbomachine assembly of claim 10, wherein the fuel nozzle includes the tab and the seal member includes the groove floor.

12. The turbomachine assembly of claim 10, wherein the seal member includes the groove floor and the fuel nozzle includes the tab, wherein the tab and the fuel nozzle are portions of the same continuous, monolithic component.

13. The turbomachine assembly of claim 1, wherein the fuel nozzle is configured to limit movement of the seal member in the direction when the spraybar is outside of a trailing edge box.

* * * * *